United States Patent
Desmet et al.

(10) Patent No.: US 11,384,948 B2
(45) Date of Patent: Jul. 12, 2022

(54) ENVIRONMENTAL CONDITION CONTROL BASED ON SENSED CONDITIONS AND RELATED METHODS

(71) Applicant: DELTA T, LLC, Lexington, KY (US)

(72) Inventors: James M. Desmet, Louisville, KY (US); David R. Banks, Lexington, KY (US); Alex Christopher Reed, Lexington, KY (US); Marcus Landon Borders, Lexington, KY (US); Jason Bishop, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 1272 days.

(21) Appl. No.: 15/307,747

(22) PCT Filed: Apr. 28, 2015

(86) PCT No.: PCT/US2015/027998
§ 371 (c)(1),
(2) Date: Oct. 28, 2016

(87) PCT Pub. No.: WO2015/168127
PCT Pub. Date: Nov. 5, 2015

(65) Prior Publication Data
US 2017/0115019 A1    Apr. 27, 2017

Related U.S. Application Data

(60) Provisional application No. 61/985,415, filed on Apr. 28, 2014.

(51) Int. Cl.
*G05D 25/02* (2006.01)
*G05D 27/02* (2006.01)
(Continued)

(52) U.S. Cl.
CPC ............. *F24F 11/30* (2018.01); *F24F 11/62* (2018.01); *F24F 11/74* (2018.01); *F24F 11/77* (2018.01);
(Continued)

(58) Field of Classification Search
CPC ............. F24F 2110/10; F24F 2120/10; F24F 2120/12; F24F 11/74; F24F 11/77;
(Continued)

(56) References Cited

U.S. PATENT DOCUMENTS 5,041,825 A    8/1991    Hart et al.
5,187,472 A    2/1993    Hart et al.
(Continued)

FOREIGN PATENT DOCUMENTS

JP    03-156623 A  *  7/1991  ............. G05D 23/00
WO    2014033189 A1    3/2014

OTHER PUBLICATIONS

Dictionary definition of the word "and", retrieved from https://www.dictionary.com/browse/and on May 10, 2019.*

*Primary Examiner* — Jerry-Daryl Fletcher
*Assistant Examiner* — Daniel C Comings
(74) *Attorney, Agent, or Firm* — Dickinson Wright PLLC; Andrew D. Dorisio

(57) ABSTRACT

An apparatus is provided for controlling environmental conditions using a fan and a light in connection with a building having a space including a partition, such as a wall. The apparatus may include a control adapted for being mounted to the partition and for coordinating the control of the fan and the light based on a sensed condition, such as temperature or occupancy. Groups of like devices for controlling environmental conditions may be similarly controlled, such as using control. Control may also provide an indication of an operational state of the device(s) controlled (Continued)

by it, or provide for control based on a preference of one or more people upon detecting their presence. Related methods are also described.

17 Claims, 6 Drawing Sheets

(51) Int. Cl.
| | | |
|---|---|---|
| *F24F 11/74* | (2018.01) | |
| *F24F 11/30* | (2018.01) | |
| *F24F 11/77* | (2018.01) | |
| *G05B 15/02* | (2006.01) | |
| *H05B 47/19* | (2020.01) | |
| *H05B 47/105* | (2020.01) | |
| *H05B 47/115* | (2020.01) | |
| *H05B 47/13* | (2020.01) | |
| *F24F 11/62* | (2018.01) | |
| *F24F 110/20* | (2018.01) | |
| *F24F 120/10* | (2018.01) | |
| *F24F 120/14* | (2018.01) | |
| *F24F 11/46* | (2018.01) | |
| *F24F 11/56* | (2018.01) | |
| *F24F 110/10* | (2018.01) | |
| *F24F 130/30* | (2018.01) | |

(52) U.S. Cl.
CPC ............. *G05B 15/02* (2013.01); *G05D 25/02* (2013.01); *G05D 27/02* (2013.01); *H05B 47/105* (2020.01); *H05B 47/115* (2020.01); *H05B 47/13* (2020.01); *H05B 47/19* (2020.01); *F24F 11/46* (2018.01); *F24F 11/56* (2018.01); *F24F 2110/10* (2018.01); *F24F 2110/20* (2018.01); *F24F 2120/10* (2018.01); *F24F 2120/14* (2018.01); *F24F 2130/30* (2018.01); *G05B 2219/2642* (2013.01); *Y02B 20/40* (2013.01)

(58) Field of Classification Search
CPC ..... F24F 2221/02; G05D 25/00; G05D 25/02; G05D 27/00; G05D 27/02
See application file for complete search history.

(56) References Cited

U.S. PATENT DOCUMENTS

| | | |
|---|---|---|
| 5,528,229 A | 6/1996 | Mehta |
| 5,627,527 A | 5/1997 | Mehta |
| 5,996,898 A | 12/1999 | Parker et al. |
| 6,189,799 B1 | 2/2001 | Parker et al. |
| 6,415,984 B1 | 7/2002 | Parker et al. |
| 7,389,806 B2 | 6/2008 | Kates |
| 7,554,437 B2 | 6/2009 | Axelsen |
| 7,855,641 B1 | 12/2010 | Okafo |
| 8,165,720 B2 | 4/2012 | Ma |
| 8,558,179 B2 | 10/2013 | Filson et al. |
| 8,665,762 B2 | 3/2014 | Knibbe et al. |
| 8,708,242 B2 | 4/2014 | Conner et al. |
| 8,963,466 B2 * | 2/2015 | Hopkins ................... H02P 5/52 318/460 |
| 2003/0225480 A1 | 12/2003 | Liu et al. |
| 2003/0225542 A1 | 12/2003 | Liu et al. |
| 2005/0277381 A1 | 12/2005 | Banerjee et al. |
| 2006/0161270 A1 | 7/2006 | Luskin et al. |
| 2007/0173978 A1 | 7/2007 | Fein et al. |
| 2008/0079569 A1 | 4/2008 | Axelsen |
| 2009/0014545 A1 | 1/2009 | Horiuchi |
| 2009/0149973 A1 | 6/2009 | Keller et al. |
| 2010/0106306 A1 | 4/2010 | Simon et al. |
| 2012/0067073 A1 | 3/2012 | Huang |
| 2012/0165993 A1 | 6/2012 | Whitehouse |
| 2012/0261078 A1 * | 10/2012 | Adams ...................... E06B 9/32 160/6 |
| 2012/0326608 A1 * | 12/2012 | Mohan ............... H05B 37/0245 315/86 |
| 2013/0038218 A1 | 2/2013 | Xu et al. |
| 2013/0099124 A1 * | 4/2013 | Filson ................ G05D 23/1902 250/349 |
| 2014/0001977 A1 | 1/2014 | Zacharchuk et al. |
| 2014/0266669 A1 * | 9/2014 | Fadell ...................... G06N 5/04 340/501 |

* cited by examiner

ENVIRONMENTAL CONDITION CONTROL BASED ON SENSED CONDITIONS AND RELATED METHODS

This application claims the benefit of U.S. Provisional Patent Application Ser. No. 61/985,415, the disclosure of which is incorporated herein by reference. The disclosures of U.S. Pat. No. 8,672,649, and International Patent Application No. PCT/US2013/067828 are incorporated herein by reference.

TECHNICAL FIELD

This application relates generally to the control of one or more environmental conditions, such as temperature or light, affecting a space occupied by a person and, more particularly, to a fixed or wall-mountable control for regulating devices for controlling such environmental conditions based on sensed conditions or personal preference.

BACKGROUND OF THE INVENTION

A device for controlling environmental conditions, such as a light or ceiling fan, may incorporate a sensor to provide a measure of an ambient condition in order to regulate the operation of the device. In some past instances, including the sensor on such a device leads to skewing of the ambient conditions being sensed, such as due to heat resulting from the consumption of power, or the location (such as along a ceiling, in the case of a ceiling fan). It may also be desirable in some instances for the ambient conditions to be sensed at a location remote from the device, which an onboard sensor for sensing local conditions would be unable to do, and possibly at the device location as well. In some applications, it may also be desirable to provide a single fixed control, such as along a wall or other partition, for coordinating multiple devices capable of controlling environmental conditions, such as a fan, a light, a diffuser, an HVAC system, a window treatment, etc., rather than several manually operable controls for individual devices. Coordinated, automatic control of such devices (e.g., a fan and a light) based on a particular condition or desire of a user would also be beneficial.

Accordingly, a need is identified for a solution that may address any or all of the foregoing limitations, along with others that have yet to be discovered.

SUMMARY

According to one aspect of the disclosure, an apparatus for controlling environmental conditions in connection with a space for occupancy by a person is provided. The space may include a partition, a fan for circulating air in the space, and a light for illuminating the space. The apparatus may comprise a control adapted for mounting to the partition and for coordinating the control of the fan and the light based on one or more sensed conditions.

One or more sensors may be associated with the control. For instance, a first sensor associated with the control may be provided for sensing a presence (occupancy or motion, such as using passive infrared technology) of the person as the sensed condition. A second sensor may be associated with the control for sensing a temperature as the sensed condition. Likewise, a third sensor may be associated with the control for sensing humidity as the sensed condition.

A thermostat may also have one or both of the first and second sensors and be adapted for transmitting the sensed presence or temperature for use in controlling the light, the fan, or both.

The control may be adapted to adjust a speed or a rotational state of the fan, and/or an intensity or on/off status of an electric light, which may be connected to the fan or the control. The control may also include one or more devices for receiving or transmitting signals over a communication network, such as a local area network or the Internet. The control may be adapted for mounting at least partially within a junction box, and may include an indicator for indicating a condition to the person (which may also comprise a night light).

According to a further aspect of the disclosure, an apparatus for controlling the environmental conditions in a space that may be occupied by a person and associated with a partition is provided. The apparatus comprises a fan positioned in the space for causing air movement therein, and a control for controlling the fan and adapted for being connected to the partition. The control includes a first sensor for sensing a presence of the person in the space and a second sensor for sensing a temperature in the space. The control may optionally include other sensors described herein (e.g., a third sensor for sensing humidity, a light sensor, a gas or particulate sensor, or any other sensor for sensing environmental conditions).

A plurality of fans may each be controlled by the control, either individually or as a group. A light control device may also be regulated by the control, such as a light connected to the fan, a light fixture, or a window treatment or window tinting. A thermostat may also be provided for regulating the operation of the fan, and an HVAC unit may be controlled by the thermostat.

The control may include a transmitter adapted for wirelessly transmitting signals to the fan. A mobile controller may also be provided for controlling the control or the fan. The control may comprise a mechanically adjustable actuator for actuating at least the fan.

The space may be bounded by a partition, and the control adapted for mounting to the partition (such as in a junction box associated therewith). The control may be connected to a common power circuit with the fan (which may be a ceiling fan), and adapted to transmit control signals for controlling the fan over the power circuit. In one example, the control is in a first room and the fan is in a second room, and the control is adapted to communicate with the fan from the first room to the second room. The control and the fan may regulate or control environmental conditions in the same room qualifying as the space.

The control may include an indicator for providing an indication to the person. The control may also comprise a night light, as well as one or more devices for receiving or transmitting signals over a communication network.

Still a further aspect of the disclosure pertains to an apparatus for use in connection with a space defined by a partition, such as a wall, the space for being occupied by one or more persons. The apparatus comprises a fan and a control adapted for being mounted to the partition and for control of the fan based on a preference of at least one person, the control implementing the control based on the preference upon sensing the presence of the person. The apparatus may further include an occupancy sensor for sensing the presence of the person or persons.

The fan may be physically connected to a light, the light also being regulated by the control. The fan may include the occupancy sensor, or the control may include the occupancy sensor. The preference may be provided to the control by the person or persons.

A sensor may also be included for sensing one or more environmental conditions. The control may be further adapted to control the fan based on the one or more environmental conditions sensed by the sensor. An additional device may also be regulated by the control. For example, the additional device may be selected from the group consisting of a light, a light fixture, an HVAC unit, a window treatment, a diffuser, a vent, and any combination thereof.

Yet a further aspect of the disclosure pertains to an apparatus for controlling environmental conditions in connection with a building having a space for being occupied by a person, the space including a partition, a first device for regulating one environmental condition in the space, and a second device for regulating another environmental condition in the space. The apparatus comprises a control adapted for being mounted to the partition, the control may include a first input for controlling the first or second device, a first indicator for indicating a first state of the first or second device, a second input for controlling the first or the second device, and a second indicator for indicating a second state of the first or second device.

The first device may comprise a light, and the first input may control an on/off state of the light or a light output intensity. The first indicator may indicate the on/off state of the light or the light output intensity. In this or any other case, the second device may comprise a fan, and the second input may control an on/off state of the fan or an operating condition of the by the fan. In this or other cases, the second indicator may indicate the on/off state of the fan or the operating condition of the fan.

The operating condition may comprise a speed of the fan or a direction of the fan. The fan may be physically connected to the light, which may comprise a separate light fixture as well (in which case the first input may control an on/off state of the light fixture or the light output intensity, and the second input controls a different feature, such as the color temperature of the light). The first indicator may indicate the on/off state and intensity of the light fixture and the second indicator may indicate the color temperature of the light.

In any embodiment, the first or second device may comprise a diffuser. In such case, the first or second input controls a state of the diffuser. The first or second indicator may indicate the state of the diffuser (open, closed, or the relative degree of such).

The control may comprise a sensor for sensing a condition selected from the group consisting of occupancy, motion, presence, temperature, humidity, light level, and any combination thereof. In particular, the control may comprise a temperature sensor and a motion or presence sensor in combination. The control may be adapted for controlling a group of first devices and/or a group of second devices.

In one particular embodiment, the first indicator and/or second indicator comprises a plurality of LEDs. The first input may comprise an upper panel and the second input may comprise a lower panel. In such case, the upper panel is adapted to activate, increase, decrease, or deactivate a state of one of the first or second devices and the lower panel is adapted to activate, increase, decrease, or deactivate the state of the other of the first or second devices.

An added aspect of the disclosure pertains to a control apparatus for controlling first and second devices for regulating environmental conditions in a space. The control apparatus comprises a first input for controlling the first device, a second input for controlling the second device, and a first sensor for sensing the presence of a person in the space. The sensor may comprise an occupancy, motion, or presence sensor, and a second sensor for sensing an environmental condition, such as temperature in the space, may be provided. The first and second sensors may be concentric, and the first input may comprise an upper portion of the control and the second input may comprise a lower portion of the control. The first sensor may be located between the upper portion of the control and the lower portion of the control.

The apparatus may further include a first indicator for indicating a status of the first device. A second indicator may also be provided for indicating a status of the second device. Each of the first and second indicators may comprise a plurality of LEDs.

Yet another aspect of the disclosure pertains to a system for controlling an environmental condition in a space. The system comprises first and second devices for regulating the environmental condition, and a controller for controlling the first device based on a control signal. The second device is adapted for being automatically controlled based on control information received from the first device.

In one embodiment, the first device includes a transmitter for transmitting the control information, and the second device includes a receiver for receiving the control information. The control may comprise a remote controller for receiving an input from a user and generating the control signal for regulating the environmental condition. The controller may be adapted for mounting to a partition associated with the space.

The first and second devices may be selected from the group consisting of fans, vents, registers, diffusers, lights, light fixtures, windows, doors, and any combinations thereof. The first and second devices may be ceiling fans, such that one such fan may broadcast its condition to the second or other fan, which may adjust its control as a result.

Yet another aspect of the disclosure relates to a system for controlling one or more environmental conditions in a space including a partition. The system comprises a first device for regulating one or more environmental conditions, and a control separate from the first device for controlling the first device, the control adapted for receiving information from the first device regarding the one or more environmental conditions.

The first device may comprises a sensor for sensing one or more environmental conditions. The control may be adapted to be mounted to the partition. A second device may be provided for regulating one or more environmental conditions, the second device being adapted for receiving control information from either the first device or the control. The first or second devices may be selected from the group consisting of a fan, a light, a light fixture, a diffuser, a window, a window treatment, or any combination thereof.

A further aspect of the disclosure pertains to a method for controlling the environmental conditions in a space that may be occupied by a person and associated with a partition. The method comprises providing a control adapted for connecting to the partition for controlling a fan for circulating air in the space, said control including a first sensor for sensing a presence of the person and a second sensor for sensing a temperature.

Another aspect of the disclosure pertains to a method for controlling environmental conditions in connection with a building having a space for being occupied by a person, the space including a partition, a fan for circulating air in the space, and a light in the space. The method comprises providing a control adapted for being mounted to the partition and for coordinating the control of the fan and the light based on one or more sensed conditions.

Still a further aspect of the disclosure pertains to a method for use in connection with a space defined by a partition, such as a wall, the space for being occupied by a person, and including a fan and a light for controlling an environmental condition. The method comprises providing a control adapted for being mounted to the partition and for regulating the fan, the light, or both, based on a preference of the person, the control implementing the control based on the preference upon sensing the presence of the person.

Still another aspect of the disclosure pertains to a method for controlling environmental conditions in connection with a building having a space for being occupied by a person, the space including a partition, a first device for regulating one environmental condition in the space, and a second device for regulating another environmental condition in the space. The method comprises providing a control adapted for being mounted to the partition, said control including a first input for controlling the first or second device, a first indicator for indicating a first state of the first or second device, a second input for controlling the first or the second device, and a second indicator for indicating a second state of the first or second device.

Furthermore, a related aspect of the disclosure relates to a method for controlling an environmental condition in a space. The method comprises providing first and second devices for regulating the environmental condition, and providing a controller for controlling the first device based on a control signal, the second device adapted for being automatically controlled based on control information received from the first device.

BRIEF DESCRIPTION OF THE DRAWING FIGURES

Figure 4:
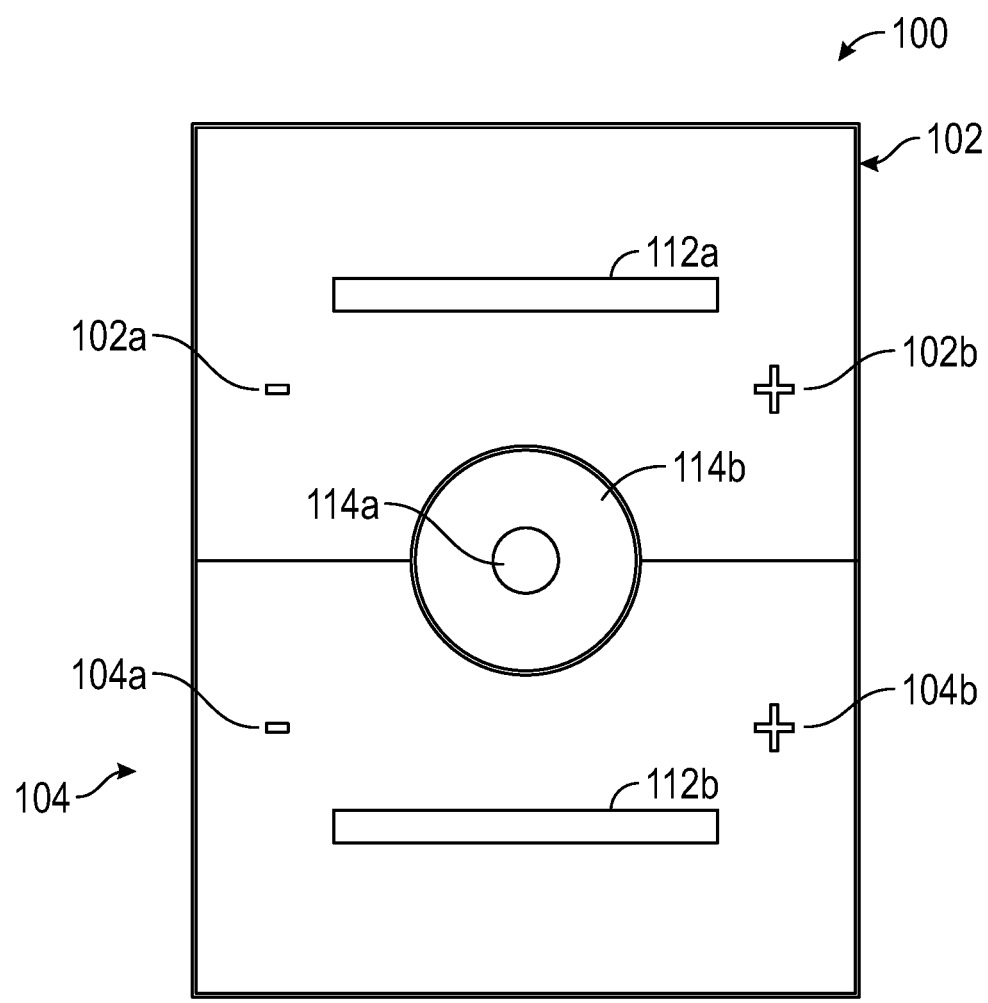
Figure 4A:
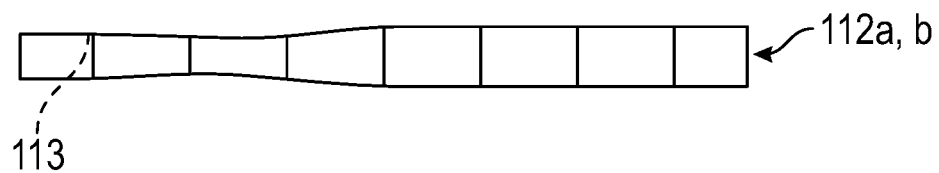

FIGS. 4 and 4a schematically illustrate one possible example of a control; and

Figure 5:
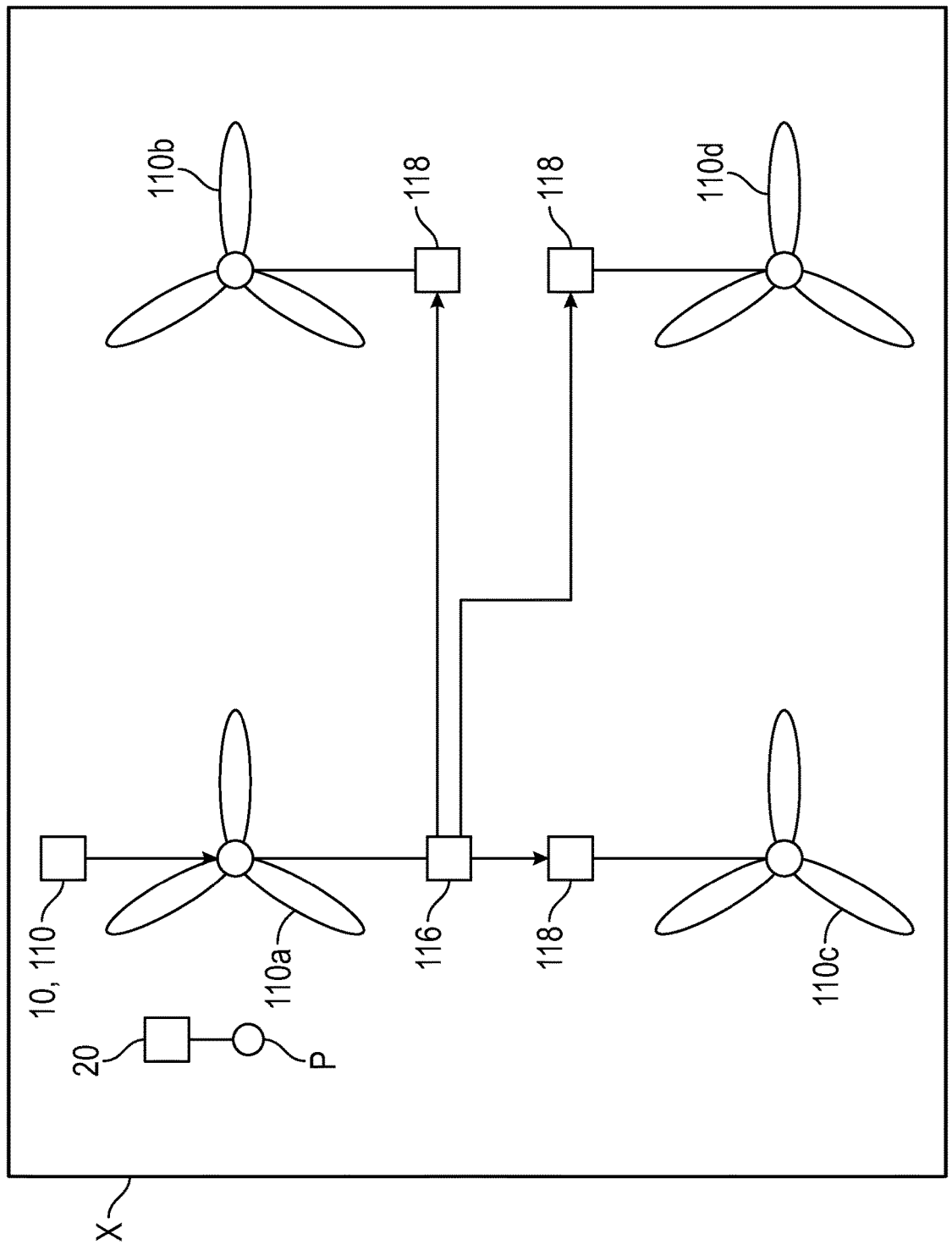
Figure 6:
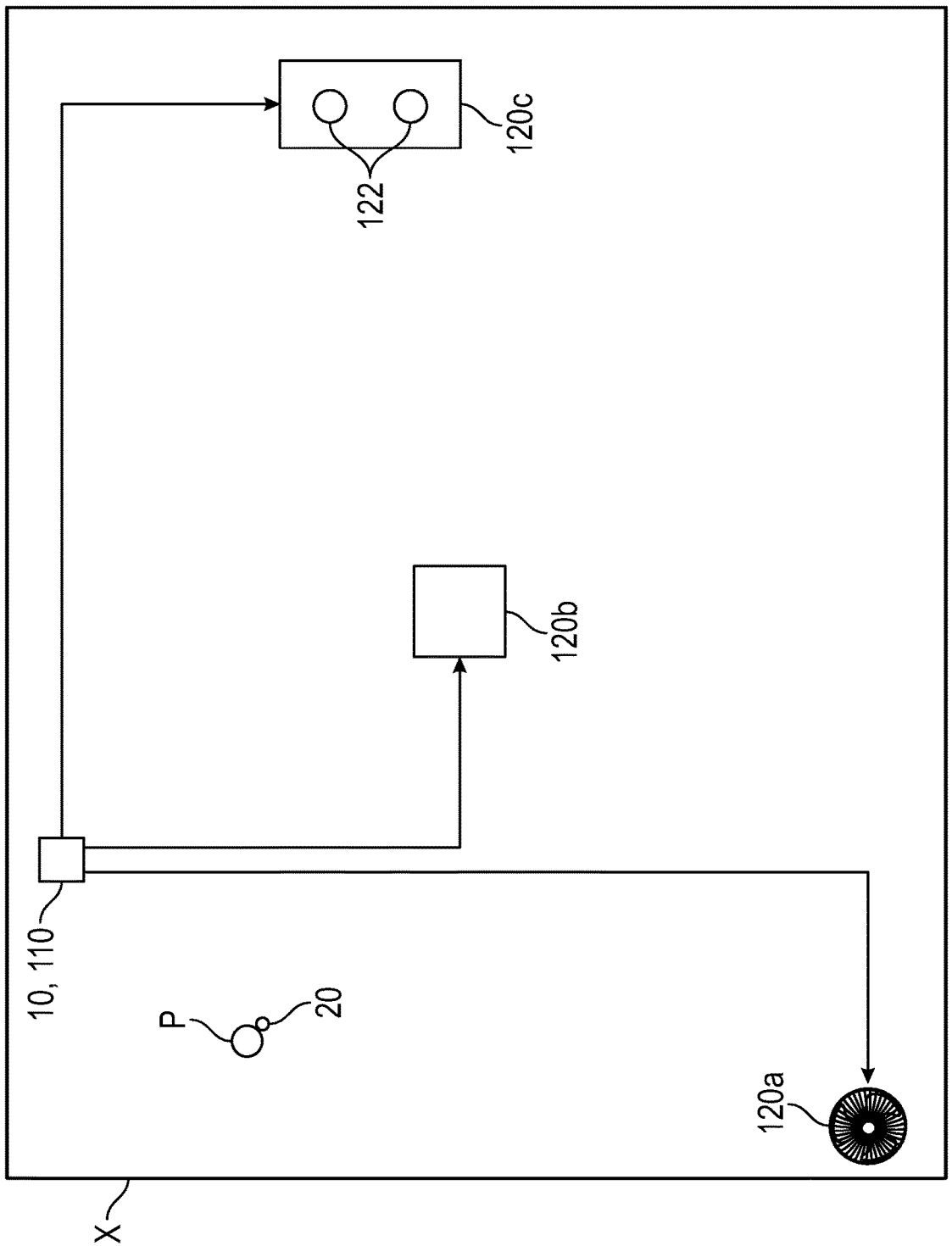

FIGS. 5 and 6 schematically illustrate other aspects of the disclosed control.

DETAILED DESCRIPTION

Figure 1A:
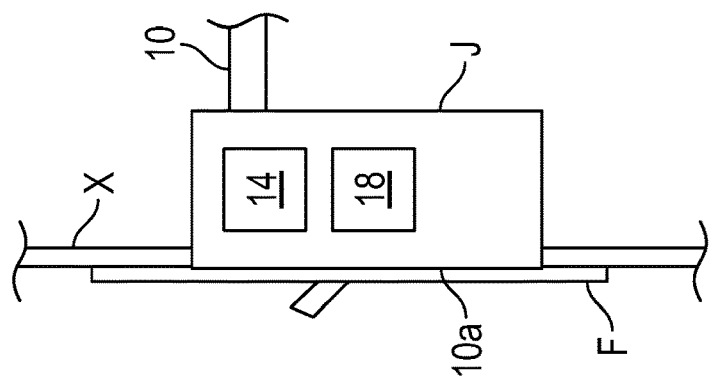
FIG. 1a is a schematic, partially cross-sectional view of the control.
Figure 1:
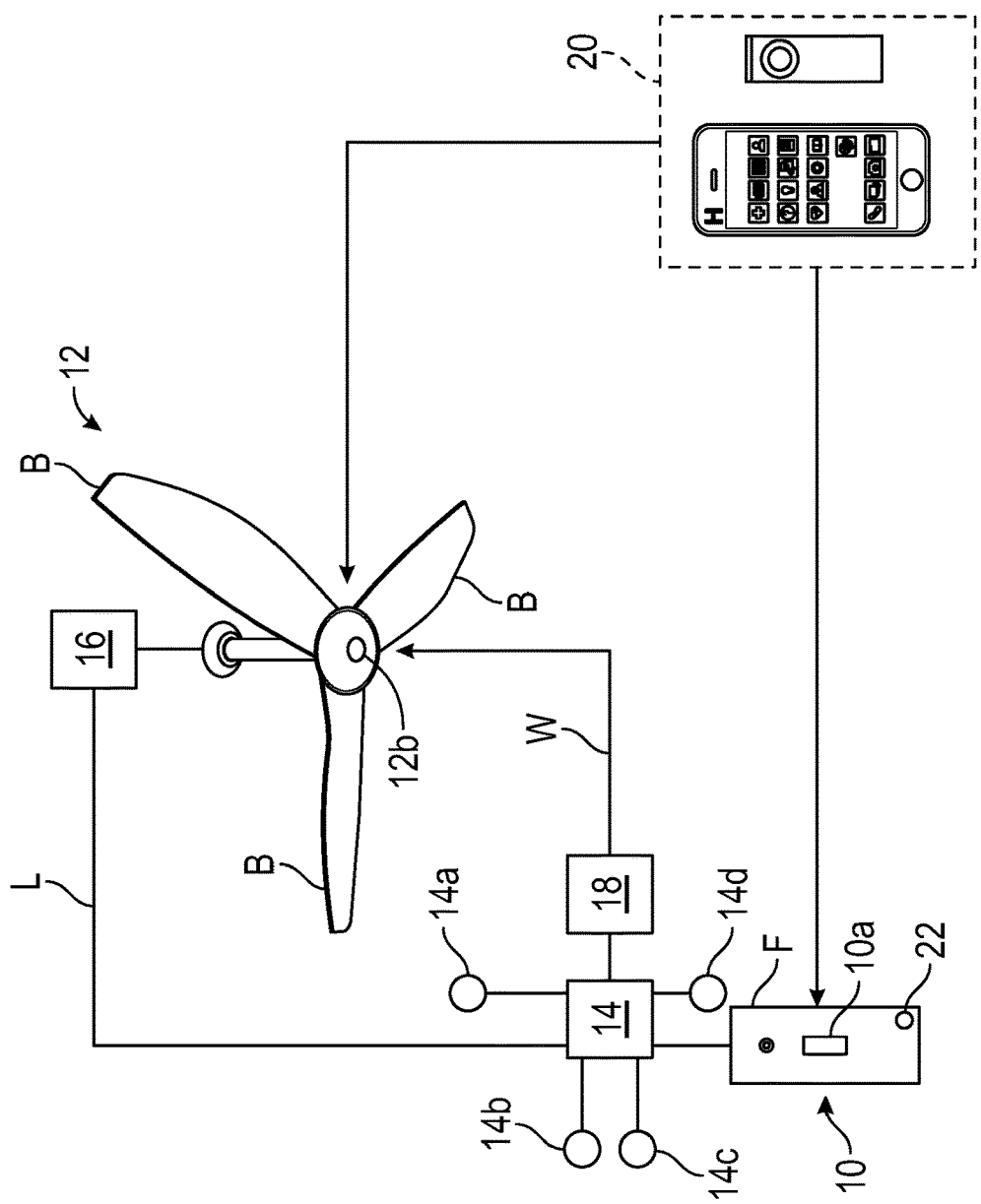
FIG. 1 is a schematic view of one possible implementation of the control.
Figure 2:
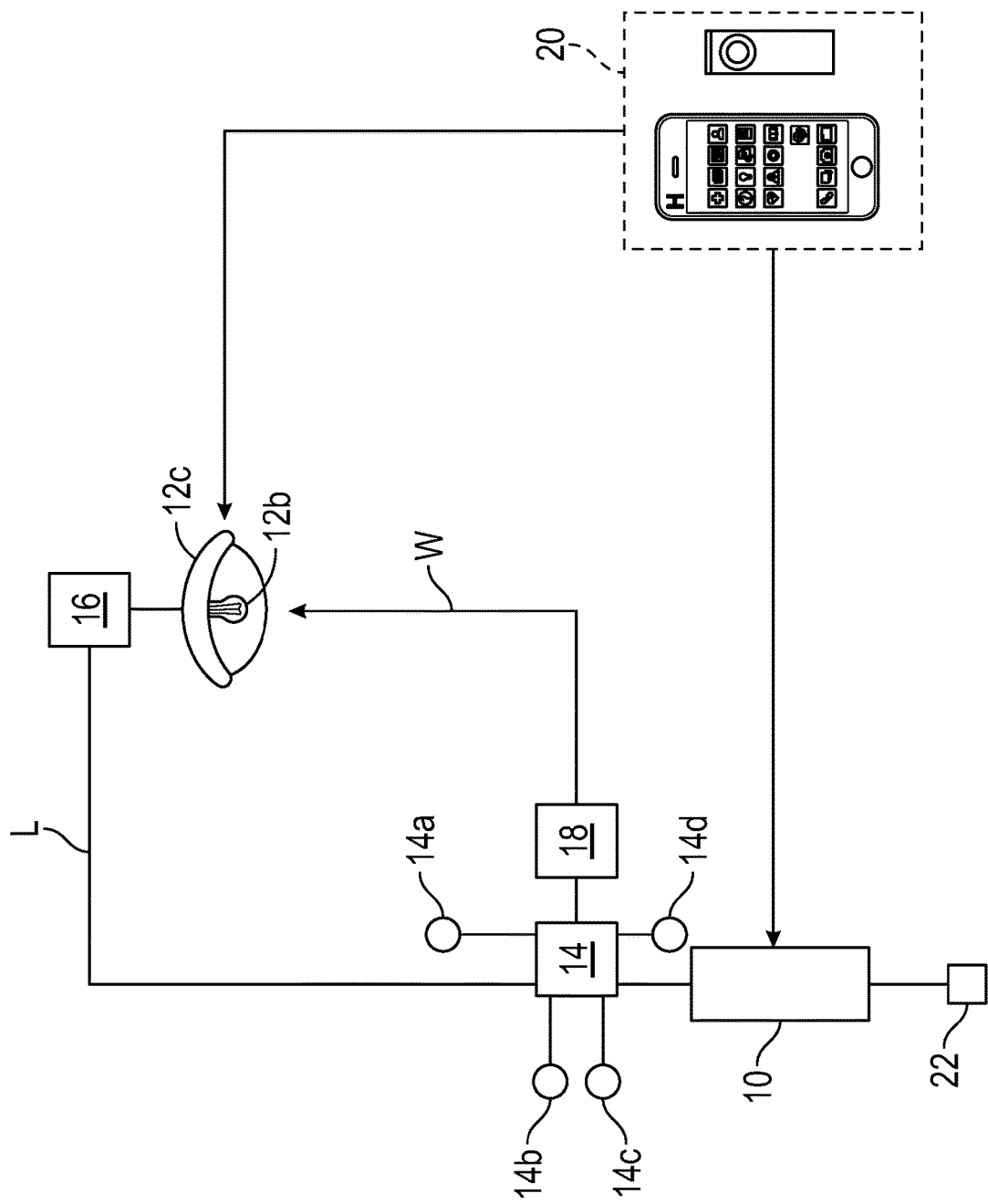
FIG. 2 is a schematic view of another possible implementation of the control.

Reference is now made to FIG. 1, which schematically illustrates one possible embodiment of a control 10 for regulating the operation of one or more environmental control device(s) 12, such as for example, a fan 12a. For purposes of illustration, the fan 12a is shown as an overhead or ceiling fan, but could be any type of fan, such as, for example, a pedestal fan, a wall-mounted fan, a window-mounted fan, an exhaust fan, or other type of fan for circulating air in a space. The device 12 may alternatively or additionally comprise a light 12b, such as a light bulb or light kit. As in the illustrated embodiment, the light 12b may be physically connected to the fan 12a, but it could be a separate structure (e.g., a mounted light fixture 12c (recessed or otherwise) including a light 12b, as shown in FIG. 2, or perhaps even a stand-alone light fixture, such as a floor or table lamp). Also, while only one device 12 is shown, it should be appreciated that the control 10 may be used to control multiple devices, regardless of the particular form, as outlined further in the following description.

In one simple form, the control 10 may serve as a switch for controlling or activating one or more of the devices, but other forms are possible as described herein. As one example, the control 10 may comprise a conventional wall-style or "Decora" unit, with a user-input (e.g., a toggle 10a or other mechanical actuator) having at least one position corresponding to an "off" condition, and at least one position corresponding to an "on" condition. The control 10 may also have more than one "on" position, such as, for example, multiple positions for regulating the fan speed (e.g., in accordance with arbitrary designations, 1, 2, 3, etc.), which may be done using a dial, buttons, or similar input devices. The more than one "on" position may also include a continuous increase in fan speed or light intensity as provided by a dimmer switch, for example. As outlined further in the description that follows, the control 10 may have one or more inputs for implementing the control of the associated devices 12, such as buttons, graphical elements on a touch display, or the like. The control 10, or switch 10a, may be adapted for mounting in a conventional recessed junction box J associated with a partition, such as a wall X, ceiling, floor, or like structure bounding a space with which the control or one or more of the devices 12 is associated. Power for the control 10 may be provided by the conventional AC wiring P in a house or building, and/or it may be powered by alternate source(s), such as a battery.

The control 10 may be associated with a controller 14 for coordinating the control of any connected devices 12. The controller 14 in turn may be associated with one or more sensors for sensing conditions at or adjacent the location of the control 10, which sensor(s) thus do not form part of the device 12 (but the control may also receive information from sensor(s) associated with the devices, such as, for example, feedback regarding the operational state or local conditions). This location of the control 10 may be in the same room or space as the device(s) 12, but is considered to be remote therefrom in the sense that it is not physically attached thereto (despite being in communication via wired or wireless connection(s), as discussed below).

The control may this be coordinated based on a sensed condition. For example, if the presence of a person in the space is detected by the control 10, multiple devices 12 may be regulated on (such as, for example, the light 12b and a separate fan 12a). Similarly, if it is determined to be at or above a particular temperature, such as based on a temperature sensor, the control 10 may regulate a light 12b to lower or turn off (if on), and may turn on a fan 12a, in an effort to condition the space and make it more comfortable. The speed of the fan 12a and the light level may also be regulated differently depending on whether the space is determined to be occupied or not (e.g., a higher fan speed may be dictated during periods of non-occupancy, as may be a lower light level; whereas, a lower fan speed may be dictated during a period of occupancy, along with a higher light level, unless a light sensor detects a sufficient amount of ambient light).

The sensor or sensors may be selected from the group consisting of a temperature sensor 14a, a humidity sensor 14b, an occupancy, presence, or motion sensor 14c, a light sensor 14d (e.g., a photocell), any other sensor for sensing a condition relating to environmental control or conditions (e.g., a gas, chemical, or particulate sensors), or any combination of such sensors. The temperature and occupancy/ motion sensors 14a, 14c, if present, may be of the type using invisible (infrared) energy, to detect temperature or occupancy at a location remote from the fan itself (i.e., anywhere outside of the device 12 in the corresponding space where the air conditions are regulated by the fan), but the temperature sensor may be a more conventional type of sensor, such as a thermocouple. An imaging device, such as a camera, could also be used to provide presence or motion sensing, and a device associated with an object (e.g., a sensor associated with a piece of furniture or an accessory therefore) could be used to detect occupancy. The sensed condition may then be used by a separate controller 16 (which may be a motor) associated with the device 12 to control its operation, such as by activating it, deactivating it, reversing it, or otherwise regulating its speed of operation.

In one particular embodiment, the transmittal of the condition (including possibly relating to the "on" condition of the fan 12a or its speed of operation, as determined by mechanical adjustment) is performed by the control 10. This may be done in several manners. For one, it may be achieved by transmitting control signals for controlling the device 12 over the circuitry used to supply power to both the device (e.g., a fan 12a including an associated light 12b) and the control 10, such as conventional AC wiring. The controller 16 for controlling the device 12 may in the case of fan 12a be an AC induction motor for causing movement of the associated fan blades B or airfoils. This connection is represented by line L in the figure. As can be appreciated, this allows for the control 10 including the sensor technology disclosed herein to be used in connection with existing fans, thereby allowing for a retrofit situation (that is, the switch may be installed and used to control an existing fan present on the same circuit).

Alternatively or additionally, the transmission of data regarding the sensed conditions may be done wirelessly. Specifically, the control 10 is associated via controller 14 with a wireless transmitter 18, such as at least one Wi-Fi radio, for transmitting the operational information (including state or speed) or sensed conditions. The transmission may be directed to a receiver associated with the controller 16, which may be within an associated housing of the device 12 (again, a fan, a light, a combined fan/light, or any other environmental control device as described herein). This is indicated by line W.

The control 10 may also be adapted for control using an intermediate device, such as a mobile or handheld remote control 20 separate from the device 12 (e.g., a mobile computer, smart phone, tablet, remote control, wearable device, or the like). The remote control 20 may issue control signals to the controller 14, such as for controlling the on/off state of the device 12.

The control 10 may also operate according to a preference of a person, which may then be implemented upon detecting the person in the space (either by way of occupancy or presence, by a wearable device, using biometrics (e.g., a fingerprint), for example). As one example, the control could be part of an alarm clock or sleep function, according to a particular schedule determined by a person as their preference and activated upon detecting the presence of the person, such as by occupancy sensing or presence detection. The control 10 may also operate in connection with a learning mode for learning the preferences of the user over time in order to regulate the one or more environmental conditions being controlled, such as described in International Patent Application Ser. No. PCT/US15/23582, the disclosure of which is incorporated herein by reference. For example, if a user adjusts the speed of a fan 12a from an existing level (using the remote control 20 or otherwise), the control 10 could note one or more ambient conditions associated with that speed (i.e., temperature, humidity, or both), and then automatically regulate the fan to operate at that speed for those conditions (thus considering it as a user preference). The control 10 may then send signal(s) to the controller 16 to regulate the operation of the device 12, such as fan 12a, in accordance with the instructions provided by the mobile or handheld control 20 or otherwise as received from or learned by the actions of the user. The remote control 20 may additionally or alternatively communicate directly with the device 12, as indicated.

Thus, in one example of use, the operation of the device 12 may be regulated by the control 10. For example, a user turning the control 10 to the "on" position would result in a signal being generated to turn on the device 12 and, in the case of a fan, cause it to rotate at a pre-determined speed (which may be specified by user according to a preference, may be based on a sensed condition, such as temperature, or both, such as by regulating the speed to a user's preference based on a sensed temperature). The sensor(s) 14a-14d may then be used to alter or vary the operation of the device 12 based on the output of the sensor(s), including in accordance with pre-determined algorithms based on desired speed for a given condition or conditions. Specifically, the device 12 may be actuated based upon the sensing of remote condition(s) (e.g., temperature, humidity, or both) at a pre-determined level, or may be de-activated once actuated (including by a user, and not necessarily as the result of an automated event) once a remotely sensed condition, such as temperature, reaches a pre-determined level.

Alternatively or additionally, the control 10 may operate to regulate the device 12 by obtaining information regarding an actual condition (e.g., temperature) sensed based on the user input. Thus, for example, in the case of a fan, if a user selects "speed 2" on a three speed control, the control 10 may via sensor(s), such as sensors 14a-14d, take note of the conditions (temperature, humidity, or both), and then provide for automatic regulation of the operation in the future based on the sensed conditions (e.g., adjusting the speed (anywhere between zero and a pre-determined maximum speed) based on a sensed change in one or more conditions). Aside from or in addition to activation and de-activation, it is also possible to regulate the speed of the device 12 according to the sensed temperature or humidity, such as based on a pre-determined or user-inputted set point value, and also to regulate the operation of fan 12a based on actual or predicted occupancy (or a lack thereof, such as to aid in destratification and possibly saving energy by preventing an associated HVAC unit from running). Adjustments to the operation controlled by the control 10 may also be made by the user via the remote control 20.

Likewise, the control 10 may be arranged to detect occupancy and make adjustments to the conditions, such as by altering the state of any device 12 connected thereto. This may include, for instance, a fan 12a and a light fixture 12c, which may be activated when a person or movement is detected. Whether the fan 12a is turned on or otherwise regulated may depend on the sensed ambient condition(s), such as for example, temperature and humidity, as determined by the sensor(s) 14 associated with the control.

Similarly, the control 10 may activate one or more devices 12 based on a sensed period of non-occupancy. For example, if a space is determined to be unoccupied at a particular moment or after the passage of time, then the control 10 may activate, deactivate, or regulate devices. For instance, if non-occupancy is detected, the lighting could be reduced by regulating any associated light 12b or light fixture 12c. Furthermore, the temperature of the associated room or space might be controlled by regulating the HVAC unit (such as to deactivate, or by controlling associated diffusers, vents or dampers to close and stop the flow of conditioned air), to regulate an associated fan 12a (which may be controlled to automatically operate in a non-occupied mode to destratify the air in the space, or if occupancy is detected to operate at a pre-determined or user-defined level), or to adjust any window treatments (such as by closing them in the event of non-occupancy, or vice-versa).

The control 10 may accommodate more than one wireless communication module (transmitter or radio), which may be part of transmitter 18 or otherwise. This would provide the capability to group multiple devices 12 across more than one wireless network (such as a local area network) in order to accomplish common goals. For instance, the control 10 may be grouped with a fan 12a and light fixture 12c over a wireless communication network (e.g., using Wi-Fi), as well as a light 12b (part of fan 12 or otherwise) over a separate wireless communication network (e.g., using the Thread protocol). Adjustments to regulate the environmental conditions could thus result in a change to multiple devices across the multiple networks controlled by the control 10, as outlined in further detail in the following description.

The control 10 may also be enabled to connect with a communications network, such as the Internet. This would allow information to be obtained from remote sources that could be used to implement the control of the device(s) 12. For instance, the control 10 could regulate the operation of the device 12 (e.g., light fixture 12c or fan 12) based on information (e.g., sunrise, sunset, weather conditions, etc.) read from a remote source (e.g., available freely over the Internet, or from a proprietary database). Information could also be transmitted over the communications network from the control 10 (e.g., sensor information from a group of devices 18 connected to the control, which could be used to determine usage, trends, etc., or possibly to control other devices).

The control 10 may also provide visual (e.g., LED indicator), audio (e.g., piezoelectric buzzer) and/or tactile (e.g., momentary switch) feedback to the user based on the conditions or the operational status. For example, as shown in FIG. 2 (and also in FIG. 4), one or more indicators, such as one or more LEDs 22, may provide an indication of status and/or a low power, "night" light when it is known to be night time (based upon built-in real time clock, information made available over the communications network, user input, or a light sensor forming sensor 14). Control of this indicator or other feedback devices may also be based upon motion detected in the space occupied by the control 10 or a different space (e.g., sensed occupancy of the bedroom at a particular time triggers the night light in different space(s) or room(s)). Additionally or alternatively, a light source, such as light bulb 12b and/or light fixture 12c, communicating with the control 10 could be enabled in order to provide a low intensity (or color shifted) light to serve as a night light based on a sensed condition, such as occupancy/presence or time.

As outlined further in the description that follows, the indicator(s) (LED(s) 22) may also be repurposed automatically by the control 10 depending on what device(s) 12 are being controlled. For example, if controlling a light 12b only, then a first indicator may represent relative intensity and a second indicator may represent relative color temperature. However, if another device, such as a fan 12a is added, then the first indicator may continue to represent relative color temperature (or intensity), but the other may be automatically repurposed to represent a condition of the fan (i.e., intensity reflective of relative fan speed).

Figure 3:
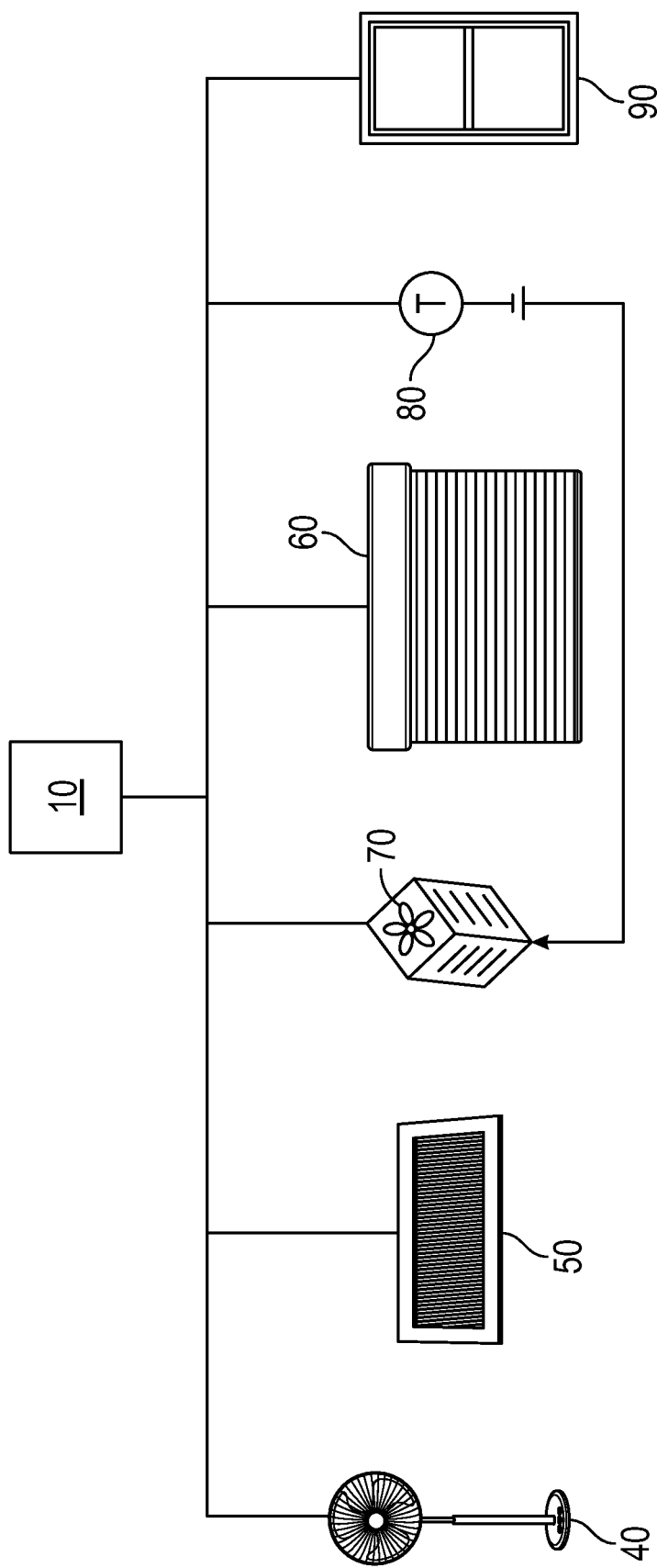
FIG. 3 is a schematic view of a further implementation of the control.

With reference to FIG. 3, the control 10 may also be adapted to interface with other devices 12 besides those mentioned, such as for example, a portable or stand-alone light fixture and/or a portable fan 40. The user may control features such as light intensity, light color (color temperature), fan direction, fan sound (such as through speed control). As shown in FIG. 3, the control 10 may also be grouped with one or more of the following automated devices: floor/wall vents 50, window treatments 60 (blinds/shades, window tinting, or the like), an HVAC system 70, thermostat 80 (which may comprise the temperature or occupancy sensor for communicating with the control 10), motorized doors/windows/shutters 90, vents, dampers, or any combination of the foregoing. The control 10 may regulate such devices 12 in a coordinated manner based on any sensed condition.

As an example, a user may elect to decrease room temperature by interfacing with the control 10, either directly or by way of the remote control 20. In turn, the control 10 may adjust the state of one or more grouped devices in a coordinated manner to accomplish this goal in the most energy efficient way (e.g. adjust a window treatment (lower the blinds), open a window or vent, regulate a damper or register, turn on the fan, regulate a thermostat, or any combination of the foregoing).

Similarly, the control 10 may sense light levels in the associated space or otherwise, such as for example by using a photocell as the light sensor. The sensed light level may then be used to regulate any device 12 associated with the control 10, including in the same space or a different space. For instance, on detecting a light level above or below a pre-determined level (e.g., a desired level set by a user, such as by using remote control 20), the control 10 may regulate, for example, one or more of a window treatment, a light bulb, light fixture, or any combination thereof, to achieve the pre-determined level. Light sensing functionality may also be used by the control 10 to regulate the operation of other devices for regulating perceived temperature, such as a thermostat or associated HVAC unit, a fan, a vent, a window, or the like.

Likewise, sensor data from the control 10 can be used by other devices in order to improve upon local environmental conditions. As an example, one of the sensors, such as the humidity sensor 14b, may be used as a queue to a thermostat or an associated HVAC system to activate the air conditioning in a particular space (zone or room) based on a sensed condition.

The control 10 including the associated sensor(s) may be activated in a variety of ways. As one example, the sensor may comprise an occupancy sensor for detecting the presence of a person in the corresponding space (and may be used to activate any associated lighting fixture 12b, including a different one in a different location (in the same room or otherwise) from the fixture that detected the occupancy). The associated controller 16 may then be used to regulate the operation of a light 12b, light fixture 12c and/or other device(s) 12 based on the sensed presence.

Alternatively, activation of the control 10 may be done audibly, by gesture, by a remote control 20, by a sensor associated with another object (including possibly an item of furniture, such as a bed, couch, or accessory therefor), by a wearable device (which may wirelessly communicate with the control 10), as a result of a network communication (e.g., a direction received over the Internet based on communication with other connected devices (such as, for example, a light fixture that may be enabled to communicate with an external network, such as the Internet), or based on environmental conditions, such as the weather (including an emergency alert, such as a tornado or storm warning), sunset/sunrise, etc., which again can be obtained over a communications network, such as the Internet), a time-based event (e.g., a pre-programmed schedule), a scene-based event (e.g., laying down for bed, turning on a television, etc.), by sensed activity in the space (as contrasted with just occupancy), or by a biometric indication (such as using a fingerprint scanner, which may be part of the control 10, or communicated to the control by the remote controller 20 including such a scanner). The activation also may be done in a particular way to provide an indication to the occupant of a certain event, such as by modulating light intensity or color of an associated light 12b (for example, in the event of an emergency or the detection of a particular condition).

In one possible implementation, the sensor(s) may comprise a modular sensor pack that may be associated with the control 10. This may be accomplished by providing a suitable connector or socket in the control 10. In this manner, the sensing capabilities of each control 10 may be adapted to the particular situation. The socket or other connector may also be adapted to connect with a communications module for communicating information to or from the control 10, including audio, video, or like signals.

Environmental data collected by the control 10 (from devices 12 on the same network, over the Internet, etc.) may be used to calibrate the sensor(s) associated with control 10 to improve performance. As an example, a control 10 installed on an exterior wall of a building or room may use environmental data collected from the Internet (i.e. outdoor temperature) to account for and accommodate any inaccuracy caused by extreme weather conditions. To further illustrate, suppose it is 0 degrees outside, but the indoor temperature is 70. The outdoor temperature may cause a lower temperature reading at the temperature sensor 14a of the control 10 (65 degrees for instance). The control 10 could then offset or attenuate the sensor reading based upon this outdoor condition such that the calibrated reading is 70 degrees.

In another example, a wall-mounted fan with a temperature sensor (including one for sensing the temperature remote from the device (e.g., a fan as described in International Patent Application No. PCT/US15/20998, the disclosure of which is incorporated herein by reference) may be located in the same room or space as the control 10. The temperature sensed by the control 10 could be used to attenuate or offset the temperature reported by the device so that the same or similar (corrected) temperatures are reported.

Likewise, a first device 12 (such as a fan 12a) may be provided for regulating one or more environmental conditions in a space. A control, such as control 10 or remote controller 20, separate from the device, may be provided for controlling the first device. The control 10, 20 may be adapted for receiving information from the first device 12 regarding the one or more environmental conditions, such as may be sensed using a sensor associated with the first device (including possibly the remote temperature sensor, but any other sensor could be used instead). A second device (such as a different fan) for regulating one or more environmental conditions may be adapted for receiving control information from either the first device 12 or the control 10, 20, which may include readings from any associated sensors (that is, sensors from the other device(s)) or information regarding particular operating modes.

With reference now to FIGS. 4 and 4a, a particular embodiment of a control 100 is shown. In this embodiment, the control 100 may include one or more user input devices, such as human interface or input portions 102, 104 (upper and lower panels in the illustrated embodiment). These inputs 102, 104 may be used by a user to provide input in order to alter the operational state or condition of one or more associated devices 12 (such as by touch) that regulate or control different environmental conditions associated with the space (such as light, light intensity, light color temperature, temperature, air circulation, or others, without limitation). In the illustrated embodiment, each portion 102, 104 of the control 100 may have a region 102a, 104a associated with an increase ("Plus") in a particular condition (such as, for example, fan speed and light intensity, which may be in connection with an associated fan 12a and light 12b or light fixture 12c) regulated by the control 100, and an adjacent region 102b, 104b associated with a decrease ("Minus") in the condition. The portions 102, 104 may be made of a durable material, such as plastic, and adapted to engage contacts to provide the desired control function when touched or depressed, but this particular form of input is considered optional.

The control 100 may be adapted to control the on/off state of any device 12 or group of devices controlled by it (including, for example, lights 12b (bulbs) or light fixtures 12c). For instance, simply touching the corresponding portion 102, 104 may be sufficient to activate the associated device(s). To turn the device(s) off, the control 100 may be manipulated to do so, such as by using either the decrease or "Minus" feature, or else simultaneously depressing both the increase/decrease feature.

Optionally, the control 100 of this embodiment may further include one or more indicators, such as strips 112a, 112b of individually controlled LEDs (which may be controlled by control 100 not only to be on or off, but also to adjust the intensity thereof; note line 113 to reflect a "half" intensity, but any intensity adjustment could be used between 0-100%, and in any stepped amount, regular or variable). The indicators may be used for indicating the particular status of the condition being regulated (such as for example, fan speed, light intensity, open/closed state of a diffuser or window treatment, etc.). The indication may be done by illuminating the LEDs from one side of the strip 112a, 112b to the other, or may be from the center outward (such as in a "balanced" fashion or otherwise). The intensity of the LEDs may also be regulated depending on the particular mode of operation (e.g., in the case of a sleep mode, the intensity may be lowered or turned off after a particular period of time).

The control 100 may regulate one or more of the devices 12 based on their association with the control, which may be by way of automatic detection or manual association (such as by using a mobile computer or otherwise). For instance, if the control 100 is associated with a space including a fan 12a including a light 12b, then upon control detecting these devices or otherwise being activated to communicate with them (such as by manual pairing), the portion 102 may, for example, be used to actuate the light 12b or control the light intensity or color temperature. A corresponding indication by indicators, such as strip 112a (with the LEDs being illuminated accordingly; see FIG. 4a, which shows a strip of a plurality of LEDs (seven, but more or fewer could be used, as could other means of indication, visual, aural, tactile, or otherwise)). Portion 104 may, for example, be used to control the on/off state of the fan 12*a*, as well as an operational condition of the fan, such as the fan speed or direction (including possibly the direction of the resulting air beam (e.g., from narrow to wide in a fan where such may be regulated)). Strip 112*a* may provide a corresponding indication for observation by the user. More than one lighting condition, such as a light fixture 12*c* separate from the fan 12*a*, may also be regulated in this manner.

Likewise, in the case of a light fixture 12*c* where the light color may be regulated, the portion 102 may be used in the same manner as described above, while portion 104 is used to regulate the light color. The indicator (e.g., strip 112*b*) may be activated such that a single LED (such as the leftmost one) is turned on to indicate the presence of the color shift function, and changes in the color may be indicated by controlling the other LEDs to illuminate, controlling their intensity, or both.

Similarly, in the case of an automated (motorized) diffuser, vent, register, door, window, or similar device 12 for controlling an environmental condition (such as temperature), the portion 102 may be used to open or close the device 12 (with the closed condition being indicated by no LED being illuminated, the fully open condition being indicated by all LEDs being illuminated, and intermediate states being indicated accordingly by illuminating other LEDs), to thereby control the air supply to the space and thus potentially the temperature of it. The other portion 104 may be used for regulating other device(s) in the manner described, such as, for example a fan 12*a*, light 12*b*, light fixture 12*c*, or any group thereof.

In the event multiple like devices are present, such as a plurality of fans 12*a* or lights 12*b*/light fixtures 12*c*, they may be grouped for common control, such as by control 10, 100 or remote controller 20. Devices 12 may be added or removed from a group manually depending on the desires of the user, or devices may default to the same group if known to be in the same room or space. Grouped devices may respond to adjustments to the status, such as made by actuating the associated portion 102, 104 of the control 100, or otherwise by way of a controller, such as remote control 20 (e.g, a mobile or handheld computer, laptop, or the like).

Apart from the control 100, any device or devices 12 within a group may provide a broadcast of its status on a regular or intermittent basis, such as periodically and by broadcasting a wireless signal from an associated transmitter 116 (which may form part of the device). Through an associated receiver 118 in wireless communication with the transmitter, all devices within a group may monitor the status of other devices within the group. When at least one of the devices 12 within the group changes state, then other devices with a similar feature within the group may adjust their state to match, such as by regulating an associated controller for controlling the device state. However, it should be appreciated that not all devices 12 in a particular space may be grouped, and this could be up to the desires of a particular user. Likewise, while possible, it may not be desirable for devices 12 in different spaces to be grouped for control, given the potential for different environmental conditions. Furthermore, it is possible for one device 12 (such as a fan) to associate with a sensor (onboard or otherwise) for regulating the operation of the device accordingly, and then this device may provide the control information to sensorless devices (such as in a master/slave relationship), either by broadcast or polling.

Thus, for example, as shown in FIG. 5, if a fan, such as fan 110*a* is regulated to operate at a particular speed according to a control signal (which may be provided by a user using a control, such as controller 20), the fan 110*a* may broadcast via transmitter 116 that it is operating at that speed. Other fans in the group, such as fans 110*a*, 110*b*, 110*c*, on receiving the information by way of receiver 118, may then also be controlled (such as by an onboard controller) to operate at the same speed, and may also rebroadcast the signal as well (that is, each fan 110*a*-110*d* may also include a transmitter). In this manner, common control is provided in an easy and reliable manner, without requiring the user to individually control multiple devices 12 to address a common environmental condition (e.g., temperature, light, humidity, etc.). The same arrangement may be applied to any devices in the group having like characteristics, such as for example, lights, diffusers, vents or registers, window treatments.

This grouping system may also be used in connection with the fixed control 10 (or 100), which is shown in FIG. 6, for example, mounted to a wall X of a room. The control 10, 100 may also receive control information from any device(s) 12 in the group being controlled, and issue control information to other devices in the group being commonly controlled. In other words, the control 10, 100 itself may form part of the network of controlled devices, even though the control itself is not issuing the control signals to all devices in the group, but rather is issuing control signals based on information received (i.e., feedback) from one or more of the devices 12 communicating with the control 10, 100.

As one example, if three light fixtures 120*a*, 120*b*, 120*c* (which may be associated with fans 110*a*-110*c*, but could be independent of fans, if fans are present; indeed, the illustrated embodiment proposes a floor lamp 120*a*, a central light fixture 120*b* fixed to a ceiling, and a pendant light 120*c* having plural light bulbs 122) are grouped together with the control 10, 100 and the light intensity is changed from one state to another (e.g., half to full) at the control 10, 100 then it will broadcast this change. The three light fixtures 120*a*-120*c* will receive notification that the group's intensity has changed (such as directly from the control 10, 100, or from other device(s) in the group) and will proceed to adjust their intensities (e.g., from half to full) as well. All devices within the group now reflect full light intensity (the lights will be full brightness and, with control 100, the LED indicator will be fully illuminated). The same arrangement may be applied to any of the devices 12 that have common features, including fans 12*a* with lighting kits and lights or light fixtures 12*c* together.

Likewise, if one of the light fixtures 120*a* reports to the control 10, 100 a particular condition (temperature, occupancy, light level, etc.) based on an associated sensor, this information may then be used by the control to regulate other devices in the group under control. For example, if the light fixture 120*a* detects a particular temperature and reports it to control 10, 100, the control may regulate a group of fans (such as, for example, to turn on and/or operate at a particular speed) or other environmental control devices.

In addition to a controller, the control 100 may also include one or more sensors 114, such as a motion, presence or occupancy sensor 114*a* and a temperature sensor 114*b*, which may be exposed as shown or hidden from view. In one particular embodiment, the sensors 114*a*, 114*b* are concentric, and between the portions 102, 104. These sensors 114*a*, 114*b* may remain stationary while portions 102, 104 are panels adapted to move upon being pressed to adjust the state of the controlled device(s).

Having shown and described various embodiments, further adaptations of the apparatuses, methods and systems described herein may be accomplished by appropriate modifications by one of ordinary skill in the art without departing from the scope of the disclosure (including by combining the features of any of the described embodiments in different combinations or arrangements than those expressed described). Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the disclosure should be considered in terms of claims that may be presented, and is understood not to be limited to the details of structure and operation shown and described in the specification and drawings.

The invention claimed is:

1. An apparatus for controlling environmental conditions in connection with a space for occupancy by a person, the space including a partition, a fan for circulating air in the space, and a light for illuminating the space, comprising:
a control including a switch, the control adapted for mounting to the partition and controlling the fan and the light based on one or more sensed conditions.

2. The apparatus of claim 1, further including a first sensor associated with the control for sensing a presence of the person as a first sensed condition of the one or more sensed conditions.

3. The apparatus of claim 2, further including a second sensor associated with the control for sensing a temperature as a second sensed condition of the one or more sensed conditions.

4. The apparatus of claim 3, further including a third sensor associated with the control for sensing humidity as a third sensed condition of the one or more sensed conditions.

5. The apparatus of claim 3, further including a thermostat having one or both of the first and second sensors and adapted for transmitting the sensed presence or temperature for use in controlling the light, the fan, or both the light and the fan.

6. The apparatus of claim 1, wherein the control is adapted to adjust a speed or a rotational state of the fan.

7. The apparatus of claim 1, wherein the control is adapted to adjust an intensity or on/off status of the light.

8. The apparatus of claim 7, wherein the light is connected to the fan or the control.

9. The apparatus of claim 1, wherein the control includes one or more devices for receiving or transmitting signals over a communication network.

10. The apparatus of claim 1, wherein the control is adapted for mounting at least partially within a junction box.

11. The apparatus of claim 1, wherein the control includes an indicator for indicating a condition to the person.

12. An apparatus for controlling the environmental conditions in in a space that may be occupied by a person and associated with a partition, comprising:
a fan positioned in the space for causing air movement therein;
a control for controlling the fan and adapted for being connected to the partition, said control including a first sensor for sensing a presence of the person in the space, a second sensor for sensing a temperature in the space, and a controller adapted for controlling the fan based on the sensed temperature, and
a light control device for being regulated by the control, wherein the light control device comprises a light connected to the fan, and the light comprises a light fixture.

13. An apparatus for controlling the environmental conditions in in a space that may be occupied by a person and associated with a partition, comprising:
a fan positioned in the space for causing air movement therein; and
a control for controlling the fan and adapted for being connected to the partition, said control including a first sensor for sensing a presence of the person in the space, a second sensor for sensing a temperature in the space, and a controller adapted for controlling the fan based on the sensed temperature, and
wherein the control is connected to a common power circuit with the fan, and adapted to transmit control signals for controlling the fan over the power circuit.

14. An apparatus for controlling environmental conditions in connection with a space for occupancy by a person, the space including a partition, a fan for circulating air in the space, and a light for illuminating the space, comprising:
at least one sensor for sensing at least one condition in the space;
means adapted for mounting to the partition and for controlling both the fan and the light based on the at least one sensed condition.

15. The apparatus of claim 14, wherein the means adapted for mounting to the partition and for controlling both the fan and the light based on at least one sensed condition comprises a controller for controlling both the fan and light based on the at least one sensed condition.

16. The apparatus of claim 15, wherein the means adapted for mounting to the partition and for controlling both the fan and the light based on at least one sensed condition comprises a first input for altering an intensity of the light, and an indicator for indicating the intensity of the light.

17. The apparatus of claim 16, wherein the means adapted for mounting to the partition and for controlling both the fan and the light based on at least one sensed condition comprises a second input for altering a speed of the fan, and an indicator for indicating the speed of the fan.

* * * * *